Figure 1:
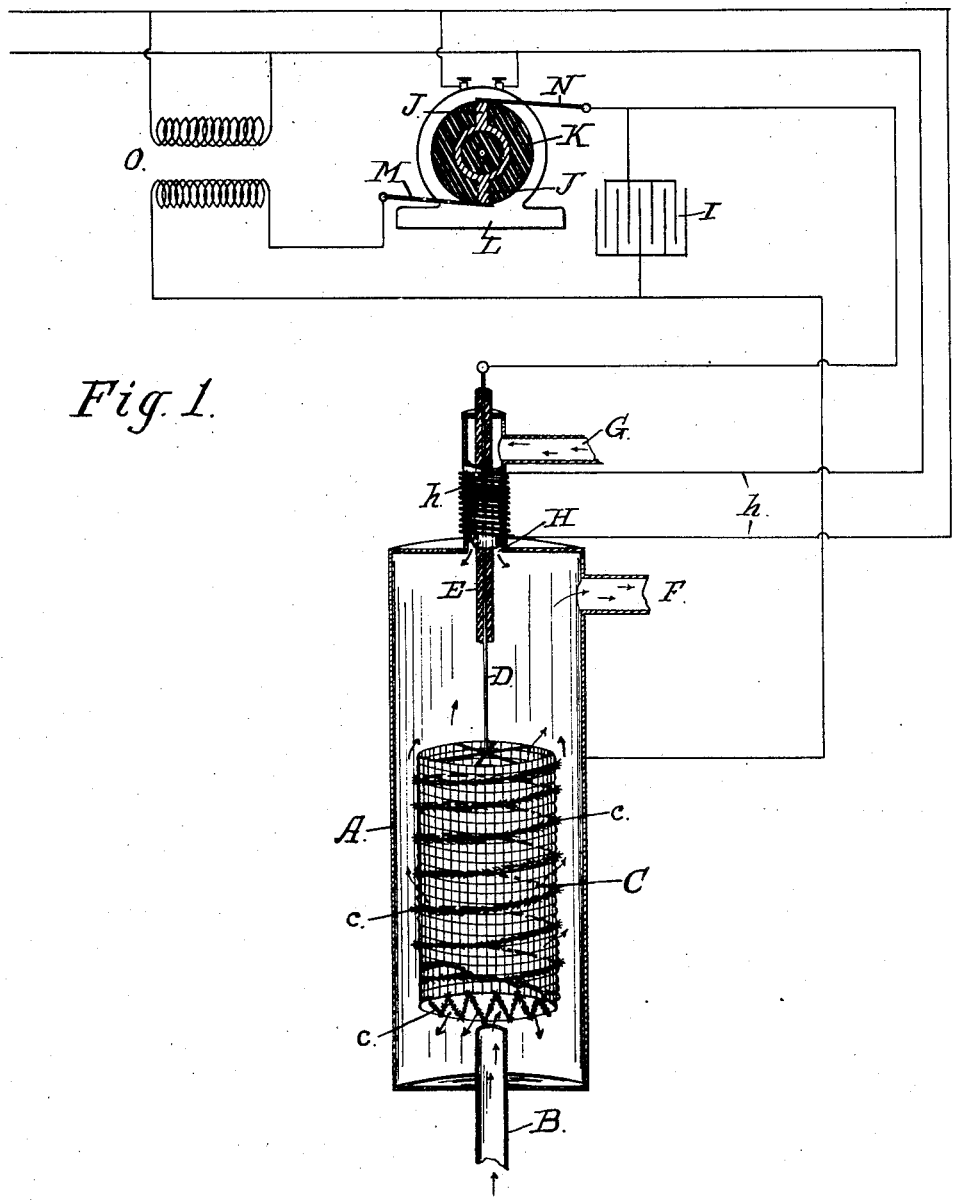

No. 895,729. PATENTED AUG. 11, 1908.
F. G. COTTRELL.
ART OF SEPARATING SUSPENDED PARTICLES FROM GASEOUS BODIES.
APPLICATION FILED JULY 9, 1907.

2 SHEETS—SHEET 1.

WITNESSES

INVENTOR
Frederick Gardner Cottrell
BY
Wm. F. Booth
ATTORNEY

No. 895,729. PATENTED AUG. 11, 1908.
F. G. COTTRELL.
ART OF SEPARATING SUSPENDED PARTICLES FROM GASEOUS BODIES.
APPLICATION FILED JULY 9, 1907.

2 SHEETS—SHEET 2.

WITNESSES.

INVENTOR
Frederick Gardner Cottrell
BY
Wm. F. Booth
ATTORNEY

UNITED STATES PATENT OFFICE.

FREDERICK GARDNER COTTRELL, OF BERKELEY, CALIFORNIA, ASSIGNOR TO INTERNATIONAL PRECIPITATION COMPANY, OF SAN FRANCISCO, CALIFORNIA, A CORPORATION OF CALIFORNIA.

ART OF SEPARATING SUSPENDED PARTICLES FROM GASEOUS BODIES.

No. 895,729.      Specification of Letters Patent.      Patented Aug. 11, 1908.

Application filed July 9, 1907. Serial No. 382,928.

*To all whom it may concern:*

Be it known that I, FREDERICK GARDNER COTTRELL, a citizen of the United States, residing at Berkeley, in the county of Alameda and State of California, have invented certain new and useful Improvements in the Art of Separating Suspended Particles from Gaseous Bodies, of which the following is a specification.

My invention relates to the art of separating finely divided particles of solids or liquids, originally held in suspension in bodies of gas or vapor, by the application of electric charges.

It has long been known that when gases containing suspended particles, such as smoke, fog, dust, mists, etc., are brought into the neighborhood of a body charged to a high electric potential with respect to its surroundings, that is, into an electric field, the suspended matter tends to be deposited. This is especially noticeable in the case of charged points; the particles being repelled from these. It has, repeatedly, been proposed to employ these agencies in technical operations; but, difficulties in their application and control have, up to the present, greatly limited their general introduction on a practical scale.

The utility and economic importance of an efficient process of this character may readily be appreciated by reference to such matters as; the efforts now being made to clean iron blast-furnace gas, of dust, preparatory to its use in gas engines; the extensive fume and dust flues, bag houses, and the like, employed in the lead and copper smelters; and the filtering systems to remove mist in the sulfuric acid plants, to say nothing of the problem of destroying fog and mists in the open air, both on land and water.

The improvements herein described are the logical outcome of an analysis of the underlying principles, with due regard to the structural and instrumental difficulties to be met with in their application. The result of such analysis leads to the following as conditions favorable for successful operation:

First, the use of essentially direct currents, that is, constancy of direction of the force in the electric field. The terms "essentially direct", and, "essentially constant polarity" are, herein, throughout, to be understood as including, if necessary, conditions involving reversals of polarity which are infrequent as compared with the time necessary for the deposition of the individual particles of suspended matter.

Second, the charging of suspended particles by the action of an electrode presenting a considerable extent of surface over which a fairly uniform and moderately intense discharge of the brush or glow type, is maintained into the surrounding gas.

Third, the attraction and collection of the particles thus charged, by electrode surfaces of opposite polarity upon which brush or glow discharge is reduced to a minimum.

Fourth, the passage of the particle-laden gases through the electric field produced by these electrodes, in such wise as to secure the most thorough and uniform treatment of the whole.

Fifth, aside from the current carried by the gas and moving particles, the maintenance of as perfect insulation as possible between the two electrodes, more especially guarding against short circuits and leaks through the material deposited out of the gases themselves during the operation. It must be further borne in mind that any process which in itself is to materially advance the state of the art from a practical or economic standpoint, should admit of being carried out in a simple and inexpensive form of construction, free from the necessity of delicate adjustment of exposed parts, having easily replaceable parts demanding little attention, and consuming relatively little power.

The improvements of the present application have been designed to fulfil all the above conditions, and consist of the four essential elements and their combination, as follows:— First. The maintaining at suitable relative electrical potentials of two types of electrode surface. Second. The charging of suspended particles by brush or glow discharge from the one type of electrode surface. Third. The attraction of the thus charged particles to the other type of electrode surface. Fourth. The prevention of the deposition of the suspended particles upon the surface of the solid insulating supports between the two types of electrodes.

Figure 2:
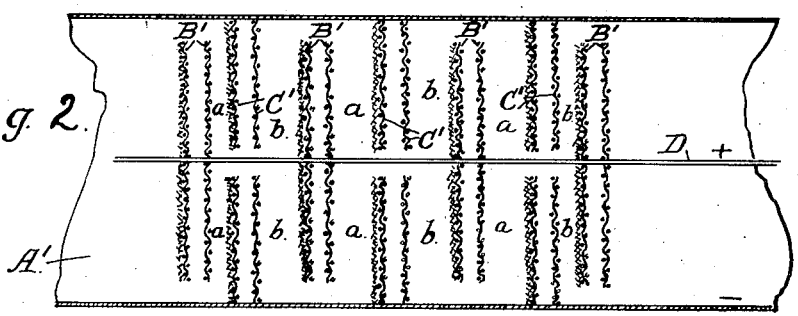
Figure 3:
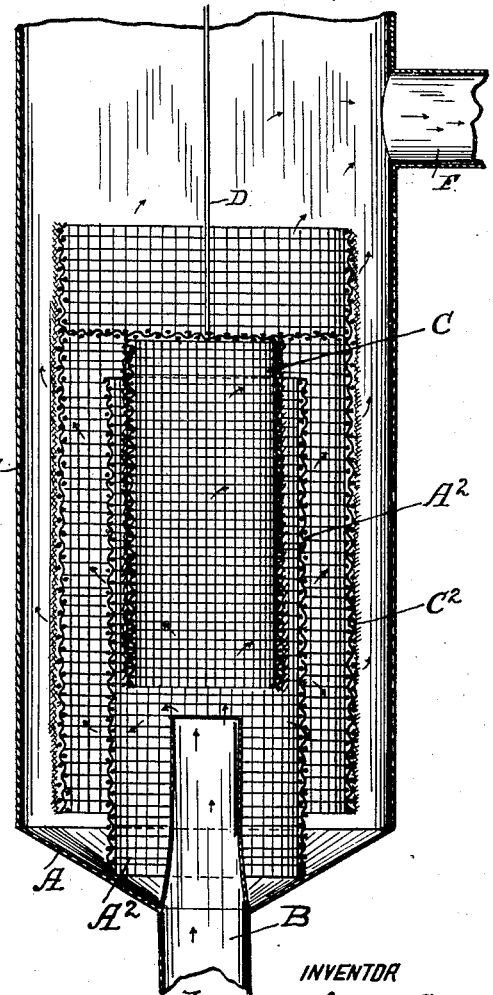
Figure 4:
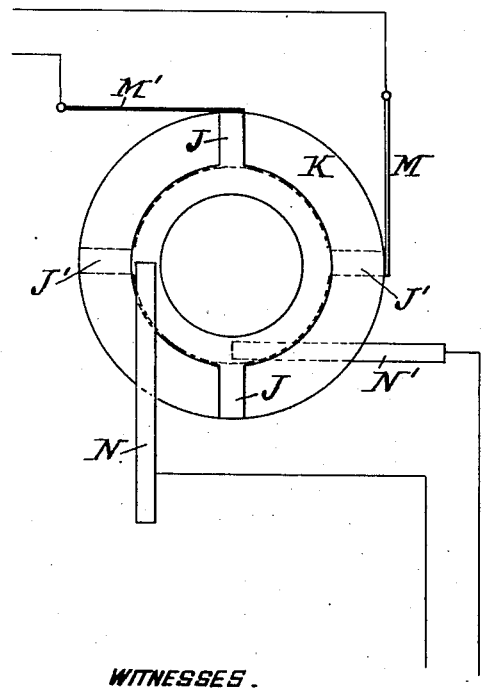

As so many of the failures of previous processes in this line appear to have resulted from the impracticability of meeting the demands of these requirements with suitable economic apparatus, I have in the following description of my own improvements indicated how each of the chief requirements may actually be met in practice. This is facilitated by reference to the accompanying drawings in which Figure 1 is a general view of an apparatus, diagrammatically illustrated, by means of which my improvements may be carried out. Fig. 2 is a diagrammatic view, showing a modification of the electrodes. Fig. 3 is a view showing another modified arrangement of the electrodes. Fig. 4 is a view showing a modification of the synchronous contact device.

Referring to Fig. 1, the gases or vapors containing the suspended particles enter the precipitation chamber A through the pipe B, and come into the proximity of the active electrode C, the body of which may be made of any suitable material. In the apparatus shown, the second "active electrode", (the two oppositely charged conductors or systems of conductors, between which the precipitation actually takes place, will hereafter be referred to as the "active electrodes" whatever their structure or other relations may be) consists of the walls of the precipitation chamber itself; but, the apparatus is not necessarily limited to this form of construction. For instance, in dispelling fog, the ground or water might be made one electrode and the other suspended freely above it. If the surface of both electrodes is as smooth as possible, the efficiency of the apparatus becomes relatively small, but, if the surface of one of the electrodes is supplied with sharp points and the potential difference is high enough, a rapid repulsion of the particles from these may be observed, together with a corresponding collection of deposited material on the other electrode. Modern theories explain this action on the ground that the gas in the neighborhood of the points becomes ionized, chiefly by brush or glow discharge, and the ions combine with or condense upon the suspended particles, dragging these with them toward bodies of opposite polarity. If, in each considerable region of the gas, wholly or partially bounded by the electrodes of opposite polarity, there are points on but one of the active electrodes, the ionization of the gas, produced in this region, will be practically of but one sign, and the particles will all move toward the other electrode, provided the polarity of the electrodes remains the same. If, on the other hand, both electrodes bounding this region are provided with points, or their polarity is being rapidly reversed, ions of both signs will be produced in the gas space and attach themselves to particles. Some of these will reach each electrode, but others will mutually neutralize each other in the gas space, possibly giving rise to larger aggregates in so doing, but, on the whole, the efficiency of precipitation is reduced. This is particularly true when the electrodes are excited from a source of alternating current, as in this case the same particle is drawn first one way and then the other, if the duration of alternation is small compared with the time of travel of the particle from the point where it receives its charge to the point of deposit.

Just as many electro-chemical processes using unattackable electrodes in liquid solutions, depend upon the character of the electrode surfaces, so in the present improvements, the character of the electrode surfaces is of the utmost importance. Bare metallic electrodes of various forms and structure, including rods or wire with sharp points, wire gauze, fairly fine wire bristles, thin sheets, disks, etc., have all been tried and found impractical for treating large masses of gas; the chief objection to them lying in the intensity of electric field required and the great tendency for the discharge to become sharply localized. These difficulties are all avoided and the efficiency and ease of adjustment of the apparatus greatly increased, if the electrodes are simply covered, in whole or in part, with some soft, fibrous material, such as cotton or asbestos, presenting a pubescent surface. These, although relatively poor conductors, amply suffice, under the usual conditions, and, if necessary, the material may be so treated as to increase its conductivity. Such an electrode shows in a dark room a uniform development of luminous discharge all over its surface, even when at a comparatively great distance from the other electrode. This permits a much lower potential difference, and the employment of a greater and less uniform distance between the electrodes.

The form of active electrode C, in Fig. 1, has been found very satisfactory. It consists of a cage of wire supported by a conducting rod D. Upon the surface of the cage, including the bottom, is wound or stretched some asbestos, very conveniently in the form of a small cord or thread c. The gas, issuing from the inlet B, receives the discharge from the filaments c of asbestos on the bottom of the cage, and many of the particles are driven back and precipitated in the lower part of the chamber. Those that escape and pass between the asbestos and wire meshes into the interior of the cage, are found to follow, approximately, the direction of the arrows, emerging from the sides of the cage, apparently because of a draft or current of gas maintained by the electric discharge from the electrode C to the walls of the vessel A, and the consequent rush of particles and gas in the same direction. In so doing, the current of gas is, of course, subjected to a second purification from suspended matter. The purified gases finally pass out by the exit F.

Owing to the relatively high difference of potential between the two electrodes, they must be kept well insulated from one another. If this is effected merely by the use of solid insulators, at ordinary temperatures, there is great danger, in many cases, of the insulation being broken down by the deposit of some of the suspended matter upon the surface of the insulation, and consequent formation of a conducting film. This danger can be reduced somewhat by bringing the connection to and support for the inner electrode through the outer wall of the precipitation chamber in a part where the gas has its maximum purity from suspended matter. To further guard against any contamination from suspended matter that may have escaped precipitation by the electrodes before reaching this part of the chamber, an arrangement is shown in Fig. 1 for passing in about the insulating support E of the inner electrode, a slow current of pure dry gas through the inlet G. This is supposed to be supplied at a sufficient rate to prevent any diffusion or convection of the gas in the main chamber back into the constricted space H, the walls of which may also be made of insulating material. Another method, which may be used as an alternative or as an auxiliary to that just described, consists in heating the space H to such a temperature that deposition of the suspended matter, either in solid or liquid form, is impossible. In the drawing, the heating is shown as effected by a winding of wire $h$, through which an electric current is passed; but, any other suitable means of heating may be employed.

The deposited matter may be removed from the precipitation chamber A, in any manner most convenient, the mode depending upon its character and amount. If liquid, it may be drained off from the bottom of the chamber. If solid, it might be flushed down and out with liquid, or scraped out as a solid. These processes might be intermittent or continuous.

As previously stated, a direct current has decided advantages as a charging source for the electrodes, but its production by the usual means, at the potentials here desired, presents certain well known technical difficulties. For the production of an electric current of the relatively small magnitude actually demanded by the present improvement, the method illustrated in Fig. 1 has answered well, and has the great advantage of extreme simplicity, coupled with ease of installation and maintenance of the apparatus required. One of the active electrodes is permanently connected with one terminal of a high potential alternating current circuit, while the other active electrode is connected with the other terminal of the same circuit through a make-and-break, operated in synchronism with the alternations of the circuit, and in which contact is made once each cycle, and only for a portion of each cycle. By properly choosing the points in the cycle at which the contact is made and broken, any difference of potential may be impressed on the electrodes, from zero up to the maximum of the alternating current line, without having to alter the latter at all. It is probable that in actual practice, the maximum will generally be chosen.

In order to maintain the potential difference of the active electrodes nearly at its maximum during the portion of each cycle when the connection with the alternating current line is broken, the condenser I may be connected in parallel with the active electrodes, thus increasing the capacity of the electrode system as a whole, of which it is to be considered a part. The electrodes, in themselves, constitute an air or gas condenser, and in some cases may suffice without the auxiliary condenser I; and in any case, they supplement its capacity.

A very satisfactory device for the make-and-break above referred to has been found in a system of metallic contact points J, mounted on an insulating disk or hub K, driven by a synchronous motor L, run by the same system of alternating current as that supplying the active electrodes, and by its rotation making and breaking contact between the brushes M and N. The arrangement of the disk and contacts shown in Fig. 1, assumes two complete cycles for each revolution of the disk, but, by a proper change in the number and position of the contact points and brushes, it may be adapted to any other whole number of cycles per revolution, and, if more convenient, the disk and contacts may be mounted directly upon or driven directly from the shaft of the alternating current generator itself which supplies the system. The synchronous motor, or the generator, as the case may be, will, in practice, most probably be operated at a lower voltage than that used for charging the active electrodes, this being indicated by the introduction of the transformer O between these two circuits.

The above description serves to illustrate one of the simplest modes of carrying out my improvements. I shall now point out some of the modifications of detail which also fall within the scope of said improvements.

It is possible to combine smooth with pubescent surfaces on the same electrode and retain the advantage sought, if the disposition of the smooth and pubescent areas on the two electrodes of opposite sign be such that nowhere are pubescent surfaces of opposite sign both discharging into the same region of gas. Fig. 2 serves to illustrate what is here meant. A' is a flue through which the gas is passing, and B' B' B' B' is an electrode, each of its four sections being made, for example, of two sheets of wire gauze, slightly spaced from each other, and the left hand one only of each section having a pubescent surface, as shown. C' C' C' make up a corresponding electrode of opposite polarity. In each of the regions a a a, the gas and particles are being charged negatively, while in each of the regions b b, they are being charged positively, but, in no single region of any important extent are they receiving noteworthy charges of both signs.

The relative motion between gas and electrode may, in some cases, be best produced by moving the electrode itself through the gas, as, for example, when treating air in the open, or any gas in very large chambers. Such terms as "causing gas to pass through or past an electrode" are to be understood as including such procedure. A further extension of the same principle of electrodes shown in Fig. 1, is shown in the modified arrangement in Fig. 3. Herein is illustrated the surrounding of the active electrode C of Fig. 1, by a concentric cylinder A² of wire gauze or other suitable material, resting on the bottom of the main vessel A, and forming an extension of the inner surface of this vessel. Surrounding this again is another concentric cylinder C² of similar construction forming a part of the electrode C. The upper portion of the electrode C may be made solid, if desired, to still further guide the gas through the meshes of the several cylindrical shells. The principles of construction illustrated in Fig. 2 may, of course, also be combined with those of Fig. 3; and the number of concentric shells may be indefinitely increased. Both active electrodes may be connected and disconnected twice each cycle to the two terminals of the alternating current circuit in such wise that their relative polarity remains the same. This has the advantage of utilizing both alternations of each cycle. For this purpose, the disk, brushes and connections may be modified in some such way as is shown in Fig. 4. Corresponding parts are lettered as in Fig. 1. A second system of contact points J', similar to points J, is mounted on the opposite side of hub K, its contact points dividing the arcs between those of points J in halves; the systems of points J and J' being insulated from each other by hub K. The brush N makes permanent contact with points J; and brush N' with points J'. Brushes M and M' each make contact intermittently with points J and J'.

Having thus described my invention, what I claim as new and desire to secure by Letters Patent is,

1. The improvement in the art of separating suspended particles from gaseous bodies, which consists in subjecting said gaseous bodies to the action of a system of electrodes maintained at a high difference of electrical potential by intermittent connection with a source of alternating current, at intervals synchronized with the period of said current.

2. The improvement in the art of separating suspended particles from gaseous bodies, which consists in subjecting said particles to the action of the discharge from a pubescent electrode surface.

3. The improvement in the art of separating suspended particles from gaseous bodies, which consists in subjecting the particle-laden gases to the action of an essentially smooth and a pubescent electrode surface of widely different electrical potential.

4. The improvement in the art of separating suspended particles from gaseous bodies, which consists in subjecting the particle-laden gases to the simultaneous action of an essentially smooth and a pubescent electrode surface of opposite and essentially constant polarity.

5. The improvement in the art of separating suspended particles from gaseous bodies, which consists in causing the particle-laden gases to pass through pervious pubescent electrode surfaces, for the purpose of imparting a charge to said particles.

6. The improvement in the art of separating suspended particles from gaseous bodies, which consists in causing the particle-laden gases to pass through a succession of pervious electrode surfaces alternately pubescent and essentially smooth and of alternately opposite polarity.

7. The improvement in the art of separating suspended particles from gaseous bodies, which consists in causing the particle-laden gases to pass through a succession of pervious electrode surfaces alternately pubescent and essentially smooth and of alternately opposite and essentially constant polarity.

8. The improvement in the art of separating suspended particles from gaseous bodies, which consists in maintaining the insulation between the active electrodes over the surface of the solid insulating supports, by supplying a current of clean gas to said surface.

9. The improvement in the art of separating suspended particles from gaseous bodies, which consists in maintaining the insulation between the active electrodes over the surface of the solid insulating supports, by supplying a current of clean gas to said surface, and supplementing the same by the heating of a zone of said surface to a sufficient temperature to prevent the deposition of any conducting solid or liquid film.

10. The improvement in the art of separating suspended particles from gaseous bodies, which consists in subjecting said gaseous bodies to the action of an essentially smooth and a pubescent electrode surface of opposite polarity, maintained at a high difference of electrical potential by intermittent connection with a source of alternating current at intervals synchronized with the period of said alternating current.

11. The improvement in the art of separating suspended particles from gaseous bodies, which consists in subjecting said gaseous bodies to the action of an essentially smooth and a pubescent electrode surface of opposite polarity, maintained at a high difference of electrical potential by large electrical capacity of the electrode system which undergoes intermittent connection with a source of alternating current at intervals synchronized with the period of said alternating current.

12. The improvement in the art of separating suspended particles from gaseous bodies, which consists in subjecting said gaseous bodies to the action of an essentially smooth and a pubescent electrode surface of opposite polarity, maintained at a high difference of electrical potential by intermittent connection with a source of alternating current at intervals synchronized with the period of said alternating current, and supplying a current of clean gas to the surface of the solid insulating supports between the active electrodes, for the purpose set forth.

13. The improvement in the art of separating suspended particles from gaseous bodies, which consists in subjecting said gaseous bodies to the action of an essentially smooth and a pubescent electrode surface of opposite polarity, maintained at a high difference of electrical potential by large electrical capacity of the electrode system which undergoes intermittent connection with a source of alternating current at intervals synchronized with the period of said alternating current, and supplying a current of clean gas to the surface of the solid insulating supports between the active electrodes, for the purpose set forth.

14. The improvement in the art of separating suspended particles from gaseous bodies, which consists in subjecting said gaseous bodies to the action of an essentially smooth and a pubescent electrode surface of opposite polarity, maintained at a high difference of electrical potential by intermittent connection with a source of alternating current at intervals synchronized with the period of said alternating current; supplying a current of clean gas to the surface of the solid insulating supports between the active electrodes; and supplementing the same by heating a zone of said surface to a sufficient temperature to prevent the deposition of any conducting solid or liquid film, for the purpose described.

15. The improvement in the art of separating suspended particles from gaseous bodies, which consists in subjecting said gaseous bodies to the action of an essentially smooth and a pubescent electrode surface of opposite polarity, maintained at a high difference of electrical potential by large electrical capacity of the electrode system which undergoes intermittent connection with a source of alternating current at intervals synchronized with the period of said alternating current; supplying a current of clean gas to the surface of the solid insulating supports between the active electrodes; and supplementing the same by heating a zone of said surface to a sufficient temperature to prevent the deposition of any conducting solid or liquid film, for the purpose described.

16. The improvement in the art of separating suspended particles from gaseous bodies, which consists in subjecting said gaseous bodies to the action of an essentially smooth and a pubescent electrode surface of opposite and essentially constant polarity, maintained at a high difference of electrical potential by intermittent connection with a source of alternating current at intervals synchronized with the period of said alternating current.

17. The improvement in the art of separating suspended particles from gaseous bodies, which consists in subjecting said gaseous bodies to the action of an essentially smooth and a pubescent electrode surface of opposite and essentially constant polarity, maintained at a high difference of electrical potential by large electrical capacity of the electrode system which undergoes intermittent connection with a source of alternating current at intervals synchronized with the period of said alternating current.

18. The improvement in the art of separating suspended particles from gaseous bodies, which consists in subjecting said gaseous bodies to the action of an essentially smooth and a pubescent electrode surface of opposite and essentially constant polarity, maintained at a high difference of electrical potential by large electrical capacity of the electrode system which undergoes intermittent connection with a source of alternating current at intervals synchronized with the period of said alternating current, and supplying a current of clean gas to the surface of the solid insulating supports between the active electrodes, for the purpose set forth.

19. The improvement in the art of separating suspended particles from gaseous bodies, which consists in subjecting said gaseous bodies to the action of an essentially smooth and a pubescent electrode surface of opposite and essentially constant polarity, maintained at a high difference of electrical potential by intermittent connection with a source of alternating current at intervals synchronized with the period of said alternating current; supplying a current of clean gas to the surface of the solid insulating supports between the active electrodes; and supplementing the same by heating a zone of said surface to a sufficient temperature to prevent the deposition of any conducting solid or liquid film, for the purpose set forth.

20. The improvement in the art of separating suspended particles from gaseous bodies, which consists in subjecting said gaseous bodies to the action of an essentially smooth and a pubescent electrode surface of opposite and essentially constant polarity, maintained at a high difference of electrical potential by large electrical capacity of the electrode system which undergoes intermittent connection with a source of alternating current at intervals synchronized with the period of said alternating current; supplying a current of clean gas to the surface of the solid insulating supports between the active electrodes; and supplementing the same by heating a zone of said surface to a sufficient temperature to prevent the deposition of any conducting solid or liquid film, for the purpose described.

In testimony whereof I have signed my name to this specification in the presence of two subscribing witnesses.

FREDERICK GARDNER COTTRELL.

Witnesses:
N. A. ACKER,
D. B. RICHARDS.